United States Patent [19]

Kennedy

[11] Patent Number: 4,680,513
[45] Date of Patent: Jul. 14, 1987

[54] ELECTRIC MOTOR REVERSING CONTROL DEVICES

[75] Inventor: Gregory C. Kennedy, Port St. Lucie, Fla.

[73] Assignee: Harbor Branch Oceanographic Institute Inc., Ft. Pierce, Fla.

[21] Appl. No.: 895,670

[22] Filed: Aug. 11, 1986

[51] Int. Cl.$^4$ ............................................. H02P 1/22
[52] U.S. Cl. .................................. 318/285; 318/257; 318/283; 318/293; 318/480
[58] Field of Search ............... 318/256, 257, 280, 283, 318/284, 285, 287, 289, 291, 293, 430, 434, 480, 563; 307/254, 255, 262, 583; 363/17, 98, 132, 136

[56] References Cited

U.S. PATENT DOCUMENTS

| | | | |
|---|---|---|---|
| 3,980,934 | 9/1976 | Wright | 318/269 X |
| 4,170,750 | 10/1979 | Joyes | 318/139 X |
| 4,292,573 | 9/1981 | Ebert et al. | 318/257 X |
| 4,338,552 | 7/1982 | Pilz et al. | 318/286 X |
| 4,359,672 | 11/1982 | Hart | 318/480 X |
| 4,365,189 | 12/1982 | Hawkins et al. | 318/284 |
| 4,412,158 | 10/1983 | Jefferson et al. | 318/287 X |
| 4,558,259 | 12/1985 | Craig | 318/256 X |
| 4,580,082 | 4/1986 | Guerin-Pinaud | 318/257 X |

FOREIGN PATENT DOCUMENTS

| | | | |
|---|---|---|---|
| 58-26585 | 2/1983 | Japan | 318/293 |
| 58-136274 | 8/1983 | Japan | 318/480 |
| 59-53095 | 3/1984 | Japan | 318/480 |

Primary Examiner—William M. Shoop, Jr.
Assistant Examiner—Bentsu Ro
Attorney, Agent, or Firm—Carroll F. Palmer

[57] ABSTRACT

A control device for a reversible D.C. electric motor to protect it against damage upon reversal has a input switch circuit for reversing the flow of current through the motor's armature for reversing the direction of rotation of the motor, a first control circuit for preventing flow of current via the input switch circuit to the armature initially upon current reversing and a second control circuit for periodically interrupting the flow of current while the motor gains rotational speed after being reversed in relation to the magnitude of the flow of current through the armature. The first control circuit includes a detector circuit for determining the voltage drop existing across the armature and an automatic switch unit for (1) blocking flow of current from the input switch means to the armature until the voltage drop is determined by the detector circuit to be in a predetermined range and (2) allowing flow of the current while the voltage drop is determined to be within the range. Various circuits utilize light emitter/optocoupler/light detector combinations.

6 Claims, 3 Drawing Figures

ELECTRIC MOTOR REVERSING CONTROL DEVICES

BACKGROUND OF THE INVENTION

1. Field of the Invention

This invention relates to control devices for reversible D.C. electric motors to protect them against damage upon reversal. More particularly, it concerns such devices that can be used in harsh environments, e.g., submarine systems, require the motor armature to reach a low rotational speed before allowing control circuitry to reverse the motor's rotational direction and protect against over current shutdown for conventional H-bridge motor drives.

2. Description of the Prior Art

Direct current, reversible, permanent magnet motors are often used in harsh environments such as submarine propulsion systems, remote location robotic controllers, etc. They can be subject to instantaneous reversal commands or mechanical stalling which can result in damage or complete destruction of the motor and drive train components. Hence, there is a need to protect the motors in such situations against such damage.

It is known in the art to use the E.M.F. generated by a coasting electric motor to prevent instantaneous reversal using an arrangement of electromechanical relays, e.g., see U.S. Pat. No. 4,365,189.

Use of voltage sensors for detecting counter-E.M.F. induced in the armature, Hall-effect devices in the magnetic field of the stator and speed sensors have been disclosed for use with H-bridge motor configurations in providing D.C. motor control and protection as shown by U.S. Pat. No. 4,338,552.

Electric motor protection on reversal has also been attained with the use of contactors (relays) that can not be operated until the current flowing in the motor is below a predetermined level, see U.S. Pat. No. 3,980,934.

Further, it is know to use opto-couplers, i.e., light emitters connected to photo-detectors via fiber-optic units to control commutation sequence of electric motor controllers (see U.S. Pat. No. 4,170,750) and to turn motors on or off from a remote location (see U.S. Pat. No. 4,359,672).

In spite of the extensive prior innovations in electric motor control devices and the use of opto-couplers in electric motor control, a need exists for further improvements in control devices for reversible D.C. electric motors to protect them against damage upon reversal, particularly for motors intended for operation in harsh environments where the known relevant devices are ineffective or unuseable.

OBJECTS

A principal object of the invention is the provision of new improvements in control devices for a reversible D.C. electric motors to protect them against damage upon reversal or stalling.

Further objects include the provision of:

1. Unique arrangements that interface low voltage control circuitry to high voltage motor components thereby eliminating need for expensive, high-voltage semi-conductors in such control devices.

2. Motor control units that can be totally electrically isolated form the motor power circuits.

3. Remote control of electric motor operation using fiber optic cables between control circuits and the motor so such circuits may be placed in a remote environment where they are not subject to electrical noise, temperature change and other adverse environmental factors.

4. Such control devices that enable the motor's protective housing to be of minimal size and in which the control circuitry can be repaired without entering the motor's environment.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of new control devices for reversible D.C. electric motors that comprise (a) input switch means for reversing the flow of current through the armature leads for reversing the direction of rotation of the motor, (b) first control means for preventing flow of current via the first switch means through the armature leads initially upon current reversing by the input switch means and (c) second control means for periodically interrupting the flow of current while the motor gains rotational speed after being reversed in relation to the magnitude of the flow of current.

The first control means includes detector means for determining the voltage drop existing across the first and second armature leads, and automatic switch means for blocking flow of current from the input switch means to the armature leads until the voltage drop is determined by the detector means to be in a predetermined range and allowing flow of the current while the voltage drop is determined to be within the range.

In a preferred embodiment, the input switch means comprises a first light emitter which is activated for clockwise rotation of the motor optically connected to a first photo-detector, and a second light emitter which is activated for counter-clockwise rotation of the motor optically connected to a second photo-detector.

The automatic switch means comprises a first integrated circuit electrically connected to the armature leads of the motor and to the first photo-detector to pass current to the armature leads when the first photo-detector conducts and a second integrated circuit electrically connected to the armature leads and to the second photo-detector to pass current to the armature leads when the second photo-detector conducts.

A third light emitter is electrically connected to the first armature lead and to the first integrated circuit, a fourth light emitter is electrically connected to the second armature lead and to the second integrated circuit.

A third photo-detector is optically connected to the third light emitter and is electrically connected to ground and a fourth photo-detector is optically connected to the fourth light emitter and electrically connected to ground.

A fifth light emitter is electrically connected to the third photo-detector and optically connected to a fifth photo-detector which, in turn is electrically connected to the first photo-detector and ground.

A sixth light emitter is electrically connected to the fourth photo-detector and is optically connected to a sixth photo-detector which, in turn, is electrically connected to the second photo-detector and ground.

The objects are further accomplished by the manner in which the various stated circuits and their components are operated.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
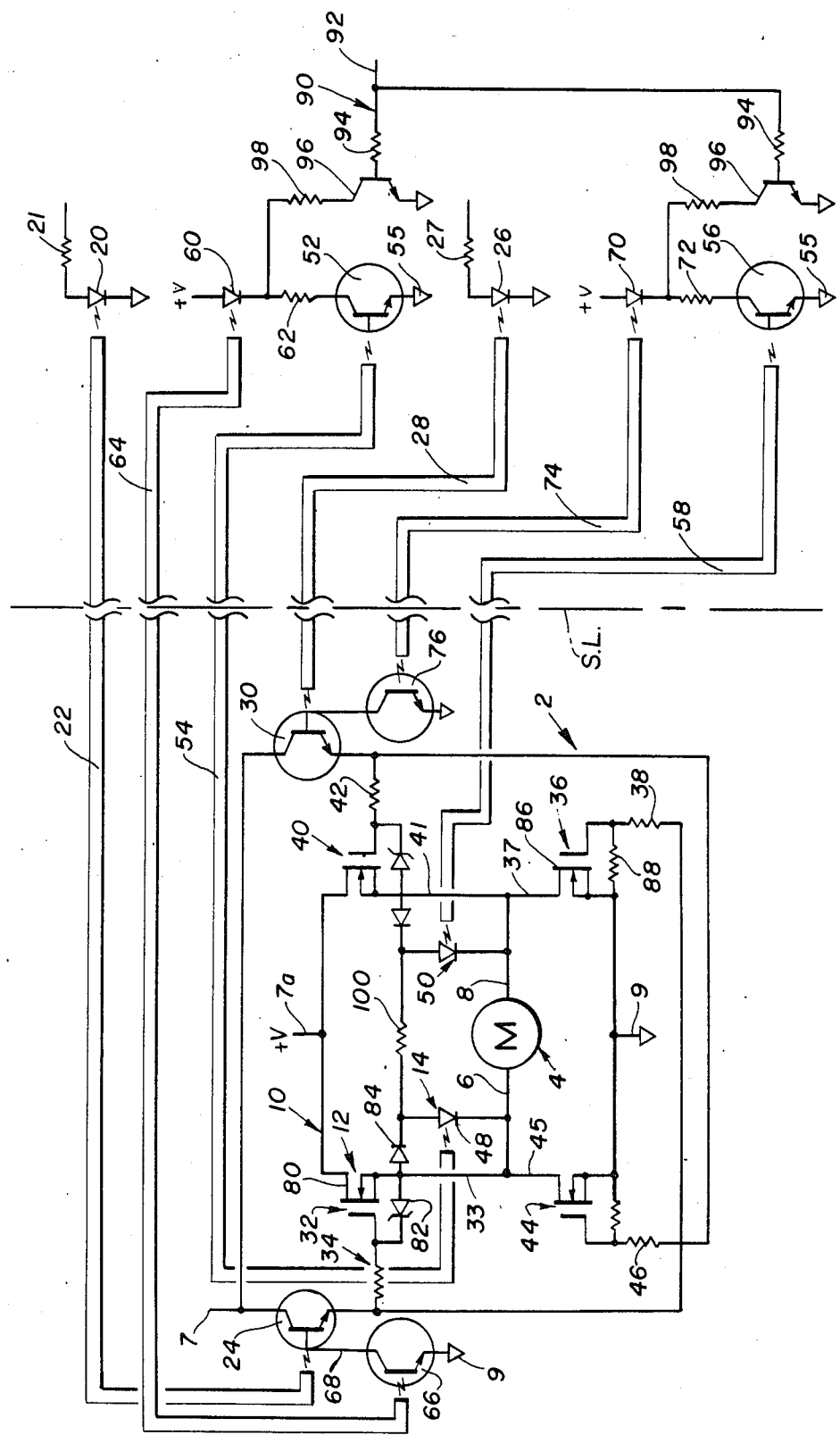
FIG. 1 is a schematic diagram of a first embodiment of electric motor control device of the invention.

Referring in detail to the drawings, in which identical parts are identically marked, the invention comprises a control device 2 for a reversible D.C. electric 4 motor having first and second armature leads 6 & 8 which comprises input switch means 10 for reversing the flow of current through the armature leads to reverse the direction of rotation of the motor 4 and automatic switch means 12 for preventing flow of current via the switch means 10 through the armature leads 6 & 8 initially upon current reversing.

The input switch means controls supply of current to motor 4 via a H-bridge configuration from positive power leads 7, 7a and primary negative ground 9 which, in turn are connected to a battery (not shown) or a DC/DC converter/voltage regulator package (not shown).

Switch means 10 includes detector means 14 for determining the voltage (EMF) drop existing across the armature leads 6 & 8, and automatic switch means 12 for blocking flow of current through the input switch means 10 to the armature leads 6 & 8 until the voltage drop is determined by the detector means 14 to be in a predetermined range and allowing flow of the current while the voltage drop is determined to be within such range.

The input switch means 10 comprises a first light emitter 20, e.g. light emitting diode, which is activated for clockwise rotation of the motor 4 by energizing resistor lead 21, optically connected via the opto-coupler 22, e.g., an optical fiber conductor, to a first photo-detector 24, e.g., a transistor. It also includes a twin circuit of a second light emitter 26, which is activated for counter-clockwise rotation of the motor 4 by energizing resistor lead 27, optically connected via the opto-coupler 28 to a second photo-detector 30.

Automatic switch means 12 comprises a first integrated power circuit 32 electrically connected via line 33 to armature lead 6 and via resistor 34 to the first photo-detector 24 to pass current to the motor 4 when the first photo-detector 24 conducts. It also comprises a first drain integrated circuit 36 electrically connected via line 37 to armature lead 8 and to the first photo-detector 24 via resistor 38 to control passing current to the motor 4 when the first photo-detector 24 conducts.

Automatic switch means 12 further comprises a twin second integrated power circuit 40 electrically connected via line 41 to the armature lead 8 and via resistor 42 to the second photo-detector 30 to pass current to the armature lead 8 when the second photo-detector 30 conducts. It also comprises a second drain integrated circuit 44 electrically connected via line 45 to armature lead 6 and to the second photo-detector 30 via resistor 46 to control passing current to the motor 4 when the second photo-detector 30 conducts.

The detector means 14 comprises a third light emitter 48 electrically connected to the first armature lead 6 and to the first integrated power circuit 32 plus a fourth light emitter 50 electrically connected to the second armature lead 8 and to the second integrated power circuit 40. Also, a third photo-detector 52 optically connected via the opto-coupler 54 to the third light emitter 48 and electrically connected to secondary ground 55, a fourth photo-detector 56 optically connected via opto-coupler 58 to the fourth light emitter 50 and electrically connected to secondary ground 55.

There is a fifth light emitter 60 electrically connected via resistor 62 to the third photo-detector 52 and optically connected via the opto-coupler 64 to a fifth photo-detector 66 which is electrically connected to the first photo-detector 24 by line 68 and to primary ground 9. Similarly, a sixth light emitter 70 electrically connected via resistor 72 to the fourth photo-detector 56 and optically connected via opto-coupler 74 to a sixth photo-detector 76 which is electrically connected to the second photo-detector 30 and primary ground 9.

The integrated power circuit 32 includes a transistor 80, a zener diode 82 to prevent the breakdown voltage of transistor 80 from being exceeded and a blocking diode 84. The power circuit 40 is a twin of circuit 32.

The integrated drain circuit 36 includes a transistor 86 and resistor 88. The drain circuit 44 is a twin of circuit 36.

The control device 2 and motor 4 are protected by the enable circuit 90 comprising a signal lead 92 twin connected via resistors 94 to transistors 96 which, in turn, are connected via resistors 98 to light emitters 60 & 70 and detectors 52 & 56. Voltage applied to lead 92 inactivates the control device 2 so that no power is supplied to motor 4 even if there should be a go command applied to control emitter 20 via input 21 or control emitter 26 via input 27.

The dashed separation line SL in FIG. 1 indicates a substantial physical separation of the components to the right of line SL from those to the left. This is made possible by the use of the elongated fiber optic elements 22, 28, 54, 58, 64 & 74. Further, since there is no electrical coupling across the line SL, the component on the right are electrically isolated from those on the left accounting for the provision of primary ground 9 and secondary 55.

Operation of First Embodiment

To initiate clockwise rotation of motor 4, a control signal is applied via input 21 to emitter 20 causing it to emit light. The light is transmitted through fiber optic 22 to photo-detector 24 which then conducts, applying voltage to the gate leads of power circuit 32 and drain circuit 36 which thereby applies current to motor 4.

As the armature of motor 4 starts to spin, the impedance of motor 4 increases causing the voltage drop across lead 6 & 8 to increase. This causes emitter 50 to emit light. The resistor determines the range through which the voltage must drop for the emitter 50, and on reverse command emitter 14, to emit light.

The light from emitter 50 is transmitted via fiber optic 58 to the disable photo-detector 56 causing it to conduct so, in turn, emitter 70 emits sending light via fiber optic 74 to photo-detector 76 causing it to conduct clamping the base lead of photo-detector30 to ground thereby blocking any CCW motor commands from emitter 26 via fiber optic 28 to the power circuit 40. This blocking condition will persist as long as there is voltage being applied to emitter 20.

When the CW command is removed from emitter 20, photo-detector 24 and circuits 32 & 36 will turn off, removing power to motor 4. With the armature of motor 4 still rotating, it now becomes a generator which maintains light emission from emitter 50 until motor rotation nearly stops. When the speed of rotation falls below level needed to light emitter 50, photo-detector 56, emitter 70 and photo-detector 76 turn off. At this point, CCW commands can be acknowledged from emitter 26 by the control device 2.

Due to the symmetry of the circuitry, the CCW operation of motor 4 and control 2 is identical to CW operation.

Overcurrent shutdown is implemented by applying a signal to the drive enable circuit 90 through input 92 thus causing emitters 60 & 70 to emit light and photo-detectors 66 & 76 to conduct thereby clamping the base leads of photo-detectors 24 & 30 to ground and shutting off all inputs to the motor control device 2.

Second Embodiment

Figure 2:
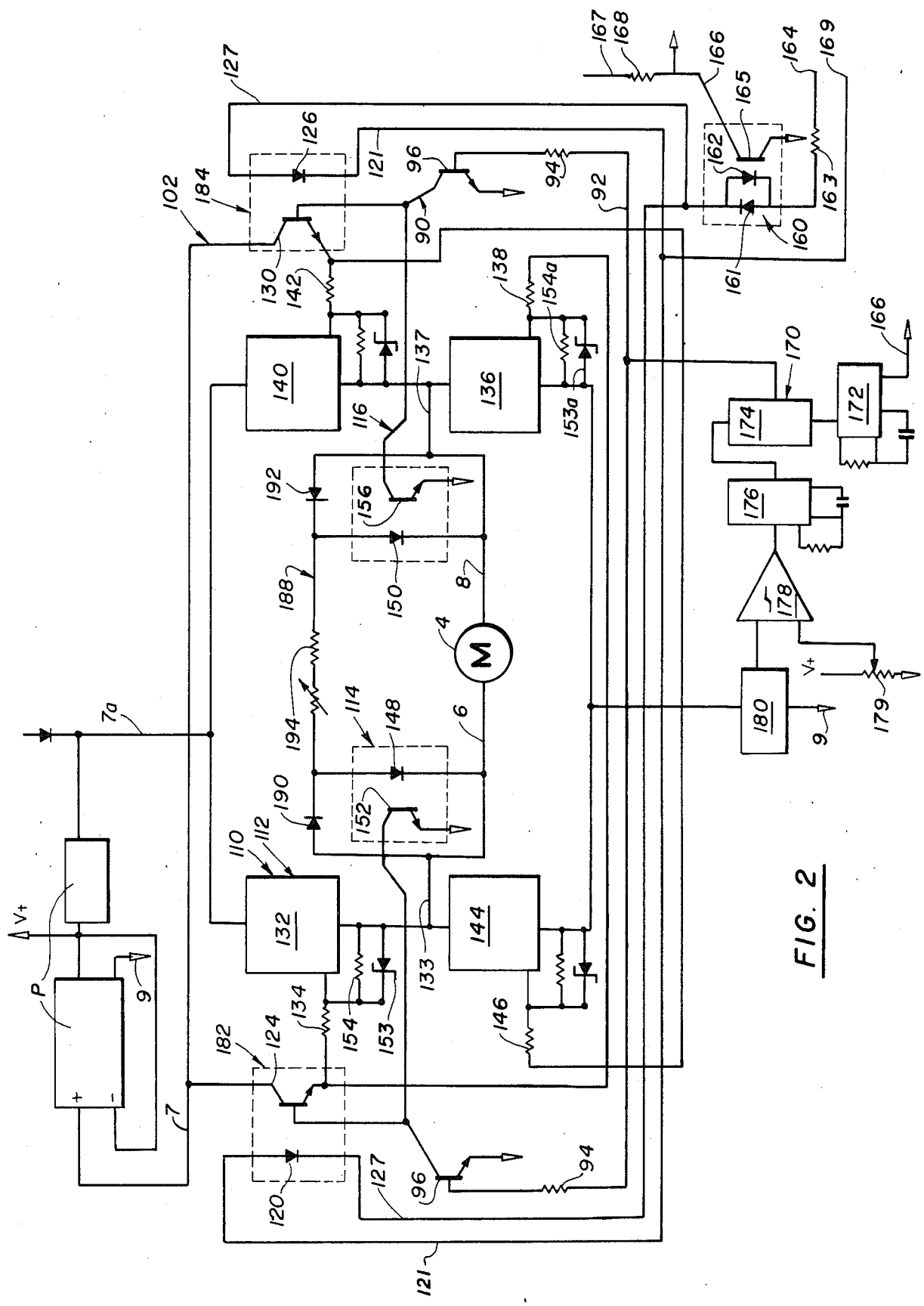
FIG. 2 is a schematic diagram of a second embodiment of electric motor control device of the invention.

A modification of the basic circuitry illustrated in FIG. 1 is shown in FIG. 2 which permits the use of control components having current rating insufficient to withstand the start-up surge current in D.C. motors. The modification also illustrates the use of emitter/photo-detector pairs in a single package (opto-isolators) where use of optical fibers are not required due to closed proximity of device components.

The second modification differs primarily from the first by the presence of second control means for periodically interrupting the flow of current, while the motor gains rotational speed after being reversed, in relation to the magnitude of the flow of current.

The control device 102 for a reversible D.C. electric 4 motor having first and second armature leads 6 & 8 comprises input switch means 110 for reversing the flow of current through the armature leads, automatic switch means 112 for preventing flow of current via the switch means 110 through the armature leads 6 & 8 initially upon current reversing.

The input switch means 110 controls supply of current to motor 4 via a H-bridge configuration from positive power leads 7, 7a and negative ground 9 which, in turn are connected to a DC/DC converter/voltage regulator package P.

Switch means 110 includes detector means 114 for determining the voltage (EMF) drop existing across the armature leads 6 & 8, and automatic switch means 116 for blocking flow of current through the input switch means 110 to the armature leads 6 & 8 until the voltage drop is determined by the detector means 114 to be in a predetermined range and allowing flow of the current while the voltage drop is determined to be within such range.

The input switch means 110 comprises a first light emitter 120 which is activated for clockwise rotation of the motor 4 by energizing lead 121, optically connected to a first photo-detector 124. It also includes a twin circuit of a second light emitter 126, which is activated for counter-clockwise rotation of the motor 4 by energizing lead 127, optically connected to a second photo-detector 130.

Automatic switch means 112 comprises a first integrated power circuit 132 electrically connected via line 133 to armature lead 6 and via resistor 134 to the first photo-detector 124 to pass current to the motor 4 when the first photo-detector 124 conducts. It also comprises a first drain integrated circuit 136 electrically connected via line 137 to armature lead 8 and to the first photo-detector 124 via resistor 138 to pass current to the motor 4 when the first photo-detector 124 conducts.

Automatic switch means 112 further comprises a twin second integrated power circuit 140 electrically connected via line 137 to the armature lead 8 and via resistor 142 to the second photo-detector 130 to pass current to the armature lead 8 when the second photo-detector 130 conducts. It also comprises a second drain integrated circuit 144 electrically connected via line 133 to armature lead 6 and to the second photo-detector 130 via resistor 146 to pass current to the motor 4 when the second photo-detector 130 conducts.

The detector means 114 comprises a third light emitter 148 electrically connected to the first armature lead 6 and to the first integrated power circuit 132 plus a fourth light emitter 150 electrically connected to the second armature lead 8 and to the second integrated power circuit 140.

The integrated power circuit 132 includes a zener diode 153 and a resistor 154. The power circuit 140 is a twin of circuit 132.

The integrated drain circuit 136 includes a zener diode 153a and resistor 154a. The drain circuit 144 is a twin of circuit 136.

In order to place the control device 102 in a command reception mode a bidirectional opto-coupler 160 is used. This comprises two paired emitters 161 and 162 electrically connected via resistor 163 to first signal lead 164 and emitters 120 and 126 plus optical connection to photo-detector 165. The latter is electrically connected at one side via lead 166 to monostable 172 and to positive power lead 167 via resistor 168 while its other side connects to ground.

Output of the paired emitters 161 and 162 is electrically connected to via lead 127 to emitter 120 and emitter 126. The second signal lead 169 connects to emitters 120 & 126 via lead 121.

There is an enable circuit 90 comprising a signal lead 92 twin connected via resistors 94 to transistors 96 which, in turn, are connected to detectors 124, 130, 152 & 156. Voltage applied to lead 92 inactivates the control device 102 so that no power is supplied to motor 4 even if there should be a go command applied to control emitter 120 via input 121 or control emitter 126 via input 127.

The control device 102 and motor 4 are protected by a second control circuit 170 comprising a monostable 172, flip-flop 174, monostable 176, voltage comparator 178, variable resistor 179 and current monitor 180.

The combination of emitter 120 and detector 124 in the device 102 constitutes a first opto-coupler 182. Similarly, emitter 126 and detector 130 form a second opto-coupler 184 and emitters 161 & 162 with detector 165 the opto-coupler 160. In these opto-couplers, the emitters and detectors may be encapsulated side by side or they may be widely separated, but optically connected by a fiber optic as in the device 2.

The H-bridge circuit 188 of device 102 includes semiconductor diodes 190 & 192 plus variable resistor 194. The resistor 194 sets the voltage at which emitters 148 and 150 will trigger to lock out the motor 4 from receiving current upon initial reversal and until it has slowed to the desired, predetermined speed to safely receive the reversing current.

Third Embodiment

Figure 3:
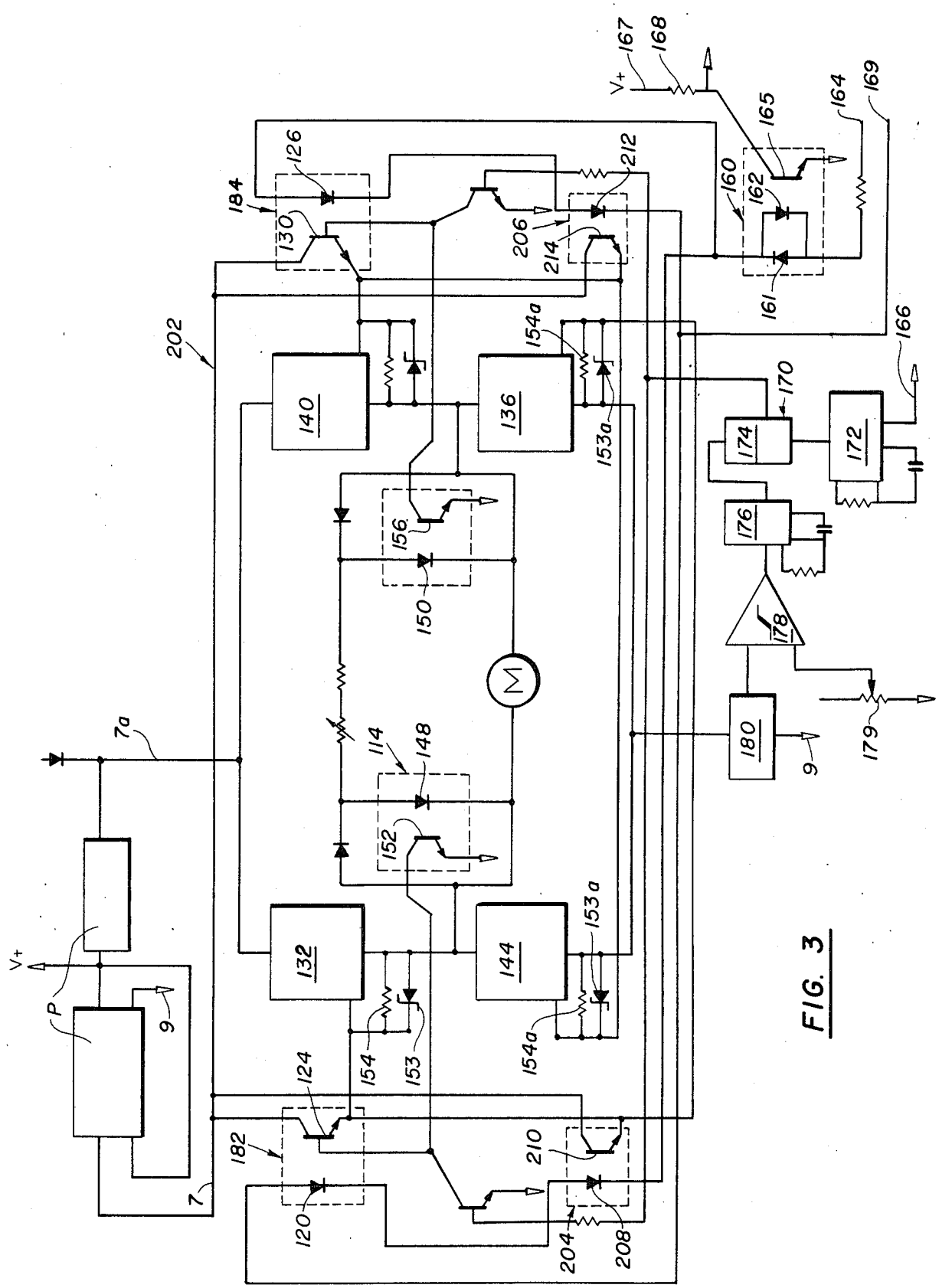
FIG. 3 is a schematic diagram of a third embodiment of electric motor control device of the invention.

The device 202 shown in FIG. 3 differs from the device 102 by the inclusion of opto-couplers 204 and 206.

Opto-coupler 204 comprises (a) an emitter 208 electrically connected to the emitter 120 and the paired emitters 161/162 and (b) the detector 210 electrically connected to detectors 124 & 130 and integrated circuits 132 & 136.

Opto-coupler 206 comprises (a) an emitter 212 electrically connected to the emitter 120 and emitter 126 and (b) the detector 214 electrically connected to detectors 124, 130 & 210 and integrated circuits 140 & 144.

Operation of the Second and Third Embodiments

When the control signal to lines 164 & 169 is zero, there is no excitation of emitters 120, 126 or 160. The photo-detectors 124, 130 and 165 within these couplers produce only a leakage current insufficient to switch-on motor control elements 132, 136, 140 or 144. Resistors 154 and 154a limit the voltage produced at the control terminal to a value less than the turn-on voltage for the given leakage current.

In the device 102, resistors 134, 138, 142 & 146 serve as RC filters in conjunction with the input capacitance of the control terminals on control devices, e.g., integrated circuits (ICs) 132, 136, 140 & 144. Under certain control states, zener diodes 153 & 153a protect these terminals from electrical breakdown when using power MOSFET transistors as control elements.

Application of a positive control signal to lines 164 & 169 (common) induces current into emitters 120 & 212. Electrical flip-flop 174 receives a high signal from monostable 172 after being triggered by detector 165. At this time, the detector 130 receives light from its emitter 126 and produces a substantial output current provided an inhibition signal is not applied to the detector 130 control input. The latter is not the case immediately after command since flip-flop 174 output is low as required by the current monitor 180 and comparator 178, which both remain low because the motor current is initially zero.

The output current of opto-coupler 160 flows into the control terminals of ICs 140 & 144. If power MOSFETs or other field controlled devices are used for ICs 140 & 144, resistors 154 & 154a establish sufficient gate-to-source voltages to turn on both elements 140 & 144.

In the device 102, in order to insure that IC 140 remains conducting and at the operating potential of the motor 4, resistor 142 is chosen smaller than resistor 146, producing a voltage division such that both ICs 140 & 144 retain sufficient gate-to-source potential to remain conducting as the motor terminal voltage increases to its operating point. As an alternative to this in device 202, there are the additional opto-couplers 204 & 206. In this third embodiment, the series resistors 134, 138, 142 & 146 are not needed since each detector 124, 130, 210 & 214, operating as a current source, establishes a potential independently at each control terminal of ICs 110, 136, 140, & 144.

The charge and discharge time of the capacitance associated with the ICs (not shown) is important to avoid damage during speed reversal and other conditions. Preferably, the turn-ons should be very rapid, as explained below with more rapid turn-off. Current drive as accomplished in device 202 facilitates these design goals.

Immediately after ICs 144 & 140 conduct, current flows from the power supply P through IC 140, motor 4 and the common terminal 7a. Initially the magnitude of this current is limited by the series equivalent of circuit plus motor D.C. resistance (R) and the combined inductance of the circuit and motor (L). Provided the motor 4 remains nearly stationary, the approximate behavior of this current magnitude is given by the formula:

$$i = V/R[1 - e^{R/L \cdot t}]$$

where V is the supplied voltage.

Thus, initially, the current builds to a very high value given by V/R after several L/R time intervals. As the motor gains speed, the effective value of R increases, eventually to a steady-state value dependent upon the motor load and frictional losses. For motors in the one horsepower range, R initially may be 0.1 ohm and rise to 1 ohm at operating speed for V=28 VDC. At present, single MOS power devices cannot withstand these 280 ampere surge currents due to resistive ($I^2R$) heating.

One method in accordance with the invention of limiting these currents to safe values employs a switching arrangement where applied power is interrupted after the current builds to a predetermined safe value. The circuits of devices 102 & 202 have this capability. The current monitor 180, e.g., a Hall effect, resistive, etc. device, and ICs 132, 136, 140, & 144 must have a response time substantially faster than the R/L time constant. Devices 102 & 202 use a linear response current sensor 180 and comparator 178, but a non-linear/digital monitor (not shown) can be used. The output of such circuit remains zero until the current preset, adjusted by resistor 179 is exceeded. Should the latter occur, a digital high condition forces flip-flop 174 output high, thereby disabling IC 140 (also IC 132). Thereupon, either IC 140 or 144 interrupt the voltage excitation to motor 4. Since some energy has been transferred to the motor's equivalent resistive load in this process, the motor 4 begins to turn. Power is re-applied after waiting a predetermined time. This time period limits the maximum repetition rate and, hence, frequency of power application. Monostable 172 controls this timing function and is set to be less than or equal to L/R. Again, the current builds to maximum, shut-off occurs and the motor 4 gains additional momentum. Eventually, in this process, the motor speed rises sufficiently to increase the equivalent circuit motor resistance R to a value which cannot permit an over-current condition. Switching action ceases and power is applied constantly until the motor 4 reaches operating speed or encounters an overload. In this operation, it is assumed that the steady-state motor current under normal load is below threshold of the motor current comparator 178.

Due to the nature of the load and motor parameters, switching action occurs for a finite period of time. For a typical unloaded motor, several seconds are needed. Switching action occurring beyond this time period can be interpreted as a "stall" or "jam" condition and can be made to digitally inhibit power application until control is removed and re-applied in either a reverse or forward direction.

The monostable 172, triggered to a high output by the control inputs 164 & 169 and connected to the reset input of flip-flop 174 implements this function. Thus, when the reset input is low, after the initial timing period, any application of a high level signal to the set input of flip-flop 174 will change its output to a high state, thereby disabling ICs 132, 136, 140 & 144.

Attempts to reverse the direction of motor 4 by reversing the polarity of control inputs 164 & 169 first disables the drive by shutting off ICs 140 & 144. Motor 4, then free-running, acts as a generator which induces a current in diode 192, resistor 194 and emitter 156. Hence, opto-coupler 182 is inhibited from conveying current to ICs 132 & 136 as a result of control terminal of opto-coupler 182 being clamped to ground by photo-current from emitter 148. When the motor 4 reaches a sufficiently slow speed, radiant output from emitter 148 ceases, opto-coupler 182 produces output current and, in turn, allows ICs 132 & 136 to conduct so the motor 4 accelerates to steady-state in the same timed current application manner as described for the forward direction.

The embodiments of the invention in which an exlusive property or privilege is claimed are defined as follows:

1. A control device for a reversible D.C. electric motor having first and second armature leads comprising:
    input switch means for reversing the flow of current through said armature leads for reversing the direction of rotation of said motor,
    first control means for preventing flow of current through said armature leads initially upon current reversing by said input switch means including:
    detector means for determining the voltage drop existing across said first and second armature leads, and
    automatic switch means for blocking flow of current from said input switch means to said armature leads until said voltage drop is determined by said detector means to be in a predetermined range and allowing flow of said current while said voltage drop is determined to be within said range, and
    second control means for periodically interrupting said flow of current while said motor gains rotational speed after being reversed in relation to the magnitude of said flow of current.

2. The control device of claim 1 wherein said input switch means comprises
    a first light emitter which is activated for clockwise rotation of said motor optically connected to a first photo-detector, and
    a second light emitter which is activated for counter-clockwise rotation of said motor optically connected to a second photo-detector, 3. The control device of claim 2 wherein said automatic switch means comprises
    a first integrated circuit electrically connected to said armature leads and to said first photo-detector to pass current to said armature leads when said first photo-detector conducts and
    a second integrated circuit electrically connected to said armature leads and to said second photo-detector to pass current to said armature leads when said second photo-detector conducts.

4. The control device of claim 3 wherein said detector means comprises
    a third light emitter electrically connected to said first armature lead and to said first integrated circuit,
    a fourth light emitter electrically connected to second armature lead and to said second integrated circuit,
    a third photo-detector optically connected to said third light emitter and electrically connected to ground,
    a fourth photo-detector optically connected to said fourth light emitter and electrically connected to ground,
    a fifth light emitter electrically connected to said third photo-detector and optically connected to a fifth photo-detector,
    said fifth photo-detector being electrically connected to said first photo-detector and ground,
    a sixth light emitter electrically connected to said fourth photo-detector and optically connected to a sixth photo-detector,
    said sixth photo-detector being electrically connected to said second photo-detector and ground.

5. The control device of claim 1 wherein said second control means comprises electrically connected in series a monostable, a flip-flop, a monostable, a voltage comparator, and a current monitor.

6. A control device for a reversible D.C. electric motor having first and second armature leads comprising:
    input switch means for reversing the flow of current through said armature leads for reversing the direction of rotation of said motor including:
    a first light emitter which is activated for clockwise rotation of said motor optically connected to a first photo-detector, and
    a second light emitter which is activated for counter-clockwise rotation of said motor optically connected to a second photo-detector, and
    control means for preventing flow of current through said armature leads initially upon current reversing by said input switch means including:
    detector means for determining the voltage drop existing across said first and second armature leads, and
    automatic switch means for blocking flow of current from said input switch means to said armature leads until said voltage drop is determined by said detector means to be in a predetermined range and allowing flow of said current while said voltage drop is determined to be within said range.

* * * * *